United States Patent [19]

Fountain et al.

[11] 4,032,330

[45] June 28, 1977

[54] PROCESS FOR RECOVERY OF COPPER

[75] Inventors: Gerald F. Fountain; Jaime Veloz; Harry R. Dahlberg; Edward A. Bilson, all of Inspiration, Ariz.

[73] Assignee: Inspiration Consolidated Copper Company, Morristown, N.J.

[22] Filed: June 30, 1976

[21] Appl. No.: 701,170

[52] U.S. Cl. .............................. 75/101 R; 75/104; 75/115; 75/117; 423/41
[51] Int. Cl.² ........................................ C22B 15/08
[58] Field of Search ................. 75/101 R, 115, 117, 75/104; 299/5; 423/41

[56] References Cited

UNITED STATES PATENTS

| | | | |
|---|---|---|---|
| 1,825,752 | 10/1931 | Mott | 75/117 |
| 2,563,623 | 8/1951 | Scott | 75/104 |
| 2,829,964 | 4/1958 | Zimmerley et al. | 75/104 |
| 3,218,252 | 11/1965 | Glover et al. | 210/4 |
| 3,260,593 | 7/1966 | Zimmerley et al. | 75/117 |
| 3,574,599 | 4/1971 | Ortloff et al. | 75/104 |
| 3,586,498 | 6/1971 | Kasey | 75/101 R |
| 3,661,563 | 5/1972 | Spedden et al. | 75/101 R |
| 3,669,651 | 6/1972 | Spedden et al. | 75/104 |
| 3,753,691 | 8/1973 | Grover et al. | 75/101 R |
| 3,886,257 | 5/1975 | Snell | 423/41 X |

*Primary Examiner*—George T. Ozaki

[57] ABSTRACT

A process for the leaching and recovery of copper values from copper-containing material which comprises vat leaching a sulfidic copper-containing material with an aqueous acidic ferric sulfate leach solution initially containing at least 10 gpl ferric ion to form a copper pregnant leach solution containing substantially less than 10 gpl ferric ion and a corresponding increase in ferrous ion concentration, extracting said leach solution with an extractant selective to copper and nonselective to iron to strip the copper values from said leach solution, adjusting the acid content of the stripped leach solution to between about 10 to 20 gpl to form an acidic leach solution, passing said acidic stripped leach solution through at least one mineral dump containing oxidized copper for a time sufficient to cause reoxidation of ferrous ion to restore the concentration of ferric ion to at least about 10 gpl, adding sufficient sulfuric acid to the dump off-solution to cause said solution to have an acid concentration of from about 10 to about 20 gpl, and recycling said acidic ferric sulfate leach solution to the vat leaching operation.

4 Claims, No Drawings

PROCESS FOR RECOVERY OF COPPER

BACKGROUND OF THE INVENTION

This invention relates to a hydrometalurgical process for extracting copper from ore containing oxidized and sulfidic copper minerals by the utilization of an acidic ferric sulfate solution and the continual regeneration of the ferric sulfate solution to permit a cyclic system. The system is of high efficiency and low energy consumption.

Solutions of acidic ferric sulfate have been used to vat leach copper values from sulfidic copper-containing minerals. The chemistry and practice of such leaching are well established. With sulfidic ores only ferric sulfate need be used and the reaction, using covellite for purposes of illustration, is as follows:

$$CuS + Fe_2(SO_4)_3 \rightarrow CuSO_4 + 2FeSO_4 + S°$$

When oxidized and sulfide minerals are associated together in the ore, the leaching solution contains both sulfuric acid and the ferric sulfate, the sulfuric acid being necessary to dissolve the oxidized minerals. In both instances, however, the ferric ion is reduced to ferrous ion, and prior proposals to reoxidize the iron to the ferric state to utilize the sulfate solution for leaching of additional ore have the disadvantage of being costly or uncertain.

In the past, such reoxidation has been effected in an electrolytic facility with simultaneous deposition of copper within the same electrolytic circuit. Such simultaneous actions sacrifice the individual efficiency of each reaction; but, even if the regeneration of the iron to the ferric state is alone carried out, the operating costs are very large.

It is also known that ferric iron can be regenerated by exposure of the leach solution, after separation of the copper (e.g. by cementation), to air. However, adequate build-up of ferric iron in the solution by this procedure is not always successful.

SUMMARY OF THE INVENTION

The present invention is directed to a cyclic process for the recovery of copper values from high grade and low grade sulfide, oxidized, or mixed copper ores. The system of this invention is of high efficiency, low cost, and forms a substantially closed system.

Briefly stated, the present invention comprises a process for the leaching and recovery of copper values from copper-containing material which comprises:

vat leaching sulfidic copper-containing material with an aqueous acidic ferric sulfate leach solution containing at least 10 gpl ferric ion to form a copper pregnant leach solution containing substantially less than 10 gpl ferric ion and a correspondingincrease in ferrous ion concentration, extracting said leach solution with an extractant selective to copper and non-selective to iron to strip the copper values from said leach solution, adjusting the acid content of the stripped leach solution to between about 10 to 20 gpl to form an acidic leach solution, passing said acidic stripped leach solution through at least one mineral dump containing oxidized copper for a time sufficient to cause reoxidation of ferrous ion to restore the concentration of ferric ion to at least about 10 gpl, adding sufficient sulfuric acid to the dump off-solution to cause said solution to have an acid concentration of from about 10 to about 20 gpl, and recycling said acidic ferric sulfate leach solution to the vat leaching operating.

DETAILED DESCRIPTION OF THE INVENTION

The initial step of the present process may be utilized with any copper-containing material which contains oxidized or sulfide copper ore or mixed oxidized-sulfide copper ore. Examples are ores containing one or more of the minerals azurite, malachite, crysocolla, tenorite, cuprite, dioptase, covellite, bornite, chalcopyrite, and the like.

The copper or is crushed and added to conventional leaching vats wherein it is contacted with an acidic ferric sulfate solution. The oxidized copper minerals, especially azurite, malachite, tenorite, and chrysocolla are readily dissolved in solutions containing at least about 1% and preferaly 2% sulfuric acid. Although cuprite is often a mineral considered not to be suitable for leaching, it has been found that the copper values of this mineral readily dissolve in the present leaching solution.

The copper values of the sulfide copper minerals are readily dissolved through the reaction of the sulfides with the ferric sulfate. The rate of dissolution is virtually independent of the strength of the sulfuric acid provided the ferric sulfate concentration does not fall substantially below about 1%.

When the copper ore contains high quantities of bornite and/or covellite the rate of dissolving the copper values from these minerals can be increased by increasing the temperature of the leaching solution. The amounts of sulfuric acid or ferric sulfate within the solution do not markedly effect the rate of dissolution of the copper values, although it is preferable to have from about 0.25 to 10% sulfuric acid, and it is necessary that the solution contain upwards of 5, and preferably at least 10, or better 15 or more, grams per liter (gpl) ferric ion.

The copper-pregnant leach solution recovered from the leaching vats is treated by solvent extraction to separate out the copper. Any extractant material (either solid or liquid ion exchanger) which is selective to the extraction of copper and is substantially non-selective to the extraction of the other minerals contained therein, especially the iron, can be used. The solvent extraction can be effected using any of the conventional extractants and techniques. Although the invention is based on the use of solvent extraction as the mode of separating the copper values from the pregnant leach solution, the particulars of the solvent extraction, per se, are not deemed to be a novel aspect of the present invention since, as noted above, any of the usual solvent extraction procedures and reagents heretofore applied to copper recovery can be used.

The utilization of solvent extraction eliminates the disadvantages previously encountered in conventional processes, such as electrowinning or cementation. The iron, either in ferric or ferrous form, does not interfere with the solvent extraction of the copper values from the leaching solution. The copper may be readily recovered by eluting from the extractant with an acid solution and treating such solution by any of the usual copper recovery processes, such as electrowinning to form cathodic copper. The extractant itself, after removal of the copper, can be continuously recycled for further extraction of copper from pregnant leach solution.

The stripped leach solution obtained from the solvent extraction process is predominantly composed of an aqueous acidic iron sulfate solution in which the iron is predominantly in the form of ferrous ion (the ferric ion concentration may be as low as 5 gpl). The acid content of the solution is adjusted to contain from about 10 to about 20 gpl of free acid, preferably in the form of sulfuric acid. The quantity of acid needed as makeup is predominantly dictated by the ore material being processed. As discussed hereinabove, oxidized copper minerals are predominantly solubilized by the action of sulfuric acid and spent acid requires replenishing. Further, by controlling the acid content of a leach solution within the range from about 10 to 20 gpl it has been found that the leach solution is readily carried through the process without causing the deposition of basic iron sulfate on the walls of the equipment or in the interstices of the dump. More importantly, this level of acid is needed to ensure that the desired level of ferric sulfate regeneration will occur during dump leaching as described below.

The stripped leach solution, after the acid content is adjusted, if necessary, is used as a leaching solution for a mineral dump, such as waste ore dump, containing oxidized copper. The leach solution is percolated through the dump in the usual manner and at the usual rates. Dumps are normally composed of low-grade material and may contain sulfidic as well as oxidized minerals of copper.

The acid-adjusted leach solution is applied to and allowed to percolate through the dump wherein the regeneration of ferric sulfate from the ferrous sulfate of the spent solution takes place. Further, during the percolation additional quantities of copper are extracted from the low-grade dump material.

The leach solution must be percolated through the dump for a time sufficient to permit the regeneration of ferric sulfate to a level of ferric ion of at least 10 gpl in the resultant dump off-solution, and preferably to a level higher than 15 gpl. It has been found that by having the above-stated level of sulfuric acid in the feed solution to the dump, and adjusting the retention time to from about at least 10 and preferably at least 20 days in the dump, one readily achieves the desired regeneration of the ferric sulfate in quantities described hereinabove.

A preferred mode of regeneration of the ferric sulfate to form a leach solution useful for recycling to the leaching vats is by using a series of dumps, preferably two or three. The off-solution from one or dump is acid-adjusted to contain from about 10 to 20 gpl of sulfuric acid, and then is passed as feed solution to the next dump in the series. The retention time in each dump is not critical but should be of sufficient duration to cause the off-solution from the final dump to contain at least 10 gpl and preferably at least 15 gpl of ferric iron. The retention time in the first dump of the series normally should be at least 10 days and preferably at least 20 days, with from 20 to 25 days being most preferred. The retention time in the second and subsequent dumps should be at least 10 days for each dump and preferably at least 20 days. Substantially quantitative regeneration of ferric iron is obtained when using the preferred retention times.

By using a series of dumps, it has been found that one can obtain substantial leaching of the copper values from the copper minerals of the dump, and simultaneously regenerate ferric sulfate within the solution to permit the off-solution to be a useful leach solution with respect to copper recovery in subsequent vat leaching of sulfidic minerals.

The off-solution obtained from the final dump used in the regeneration of the ferric sulfate is again adjusted to bring its acid content into the range from about 10 to 20 gpl of sulfuric acid, and it is then recycled for use in processing additional sulfidic copper ore in the leaching vat. Thus, the process of the present invention is a closed cyclic process which regenerates the ferric sulfate needed in the vat leaching operation. The incorporation within the process of a solvent extraction step to remove the copper obtained both from the low-grade ore of the waste ore dumps and the ore processed in the leaching vats yields a process substantially lower in cost than that of the prior art.

The sulfidic ore processed in the leacing vats should have a particle size range typical for such purpose. Normally, the ore particles should be capable of passing through a 0.371 inch screen opening and preferably, through a 2 ½ mesh (U.S. standard) screen, with a particle size range from about 2 ½ to +200 mesh. Fines should be held to less than about 20% of the total material used.

In an experimental application of the present process, copper ore containing chalocite, chalcopyrite, cuprite, chrysolcolla, malachite and pyrite was crushed, mixed and screened to contain particles minus ⅛ inch in size. The ore was added to leaching columns simulating conventional leaching vats, through which acidic ferric sulfate leach solution containing 10 gpl $H_2SO_4$ and 20 gpl ferric sulfate was passed to maintain a continuous flow rate of 2000 gallon/minute/10,000 $ft^2$. After steady state conditions were attained, the copper pregnant leach solution from the leaching operation assayed 5 gpl ferric sulfate and 15 gpl ferrous sulfate.

The resulting copper-pregnant leach solution was extracted by an ion exchanger in a standard extraction apparatus. The extractant did not extract iron and was easily separated from the leach solution. Copper was eluted from the extractant into an acid solution, from which the copper could be recovered by conventional means, and the extractant was recycled.

The spent (copper-depleted) leach solution was then percolated through a series of columns designed to simulate dumps of waste ore. Three such columns were used in series. Each column was charged with ore containing both oxidized and sulfidic copper minerals. The spent latch solution from the solvent extraction operation, containing 5 gpl ferric sulfate, 15 gpl ferrous sulfate and adjusted to contain 10 gpl $H_2SO_4$, was continuously added to the top of the first column and allowed to percolate therethrough. The off-solution from the first column was passed to the second column and, in turn, the off-solution from the second column was passed to the third column. The off-solution from each column was monitored for acid content and adjusted, prior to adding to the next column, to 10 gpl $H_2SO_4$. The rate of addition was maintained at a normal dump percolation rate of 30 gallon/minute/10,000 $ft^2$.

The off-solution of the first column, after steady state was established, leveled off to 20 gpl ferric iron concentration after 50 days of percolation. The off-solution from the second and third columns each contained 19 to 20 gpl ferric iron after 34 days of percolation through each column.

Table I below sets forth the analysis of the copper values recovered from each column simulating vat leaching:

TABLE I

Recoveries/Calculations Based on the Chemical Analysis of Head and Tails

|  | % T. Cu | % Ox. Cu | % Sulf. Cu |
|---|---|---|---|
| A. Column No. 1 | | | |
| Head | 1.056 | 0.466 | 0.590 |
| Tail | 0.242 | 0.065 | 0.177 |
| % Recoveries | 77.08 | 86.05 | 70.00 |
| B. Column No. 2 | | | |
| Head | 0.969 | 0.615 | 0.354 |
| Tail | 0.146 | 0.033 | 0.113 |
| % Recoveries | 84.93 | 94.63 | 68.08 |
| C. Column No. 3 | | | |
| Head | 0.981 | 0.616 | 0.365 |
| Tail | 0.159 | 0.043 | 0.116 |
| % Recoveries | 83.79 | 93.02 | 68.22 | values regenerated from each column simulating dumps:

TABLE II

Calculations based on chemical analysis of "ON" and "OFF" solutions from dump columns

| Leaching Time Days | Percentage regenerated | | |
|---|---|---|---|
|  | Column 1 | Column 2 | Column 3 |
| 1 | 14.78 | 13.02 | 9.81 |
| 5 | 20.49 | 16.59 | 9.87 |
| 10 | 23.72 | 21.20 | 19.00 |
| 15 | 36.12 | 49.30 | 52.71 |
| 20 | 44.39 | 68.11 | 70.62 |
| 25 | 56.80 | 81.25 | 93.78 |
| 30 | 61.76 | 92.11 | 95.65 |
| 35 | 81.38 | 93.46 | 95.92 |
| 40 | 96.02 | 95.55 | 98.72 |
| 45 | 95.50 | 95.54 | 98.95 |
| 50 | 95.63 | 98.98 | 98.62 |
| 55 | 96.73 | 99.09 | 99.08 |
| 60 | 97.09 | 99.03 | 99.56 |
| 65 | 93.30 | 99.55 | 99.55 |
| 70 | 94.79 | 99.07 | 98.31 |

The off-solution from the third dump column was again adjusted to contain 10 gpl of $H_2SO_4$ and recycled for use as the leach solution in the leaching vat columns.

Based on the excellent laboratory results from the leaching columns a field trial was run to evaluate in a plant scale size the different parameters obtained from laboratory testing. This field trial involved recirculation of the solutions without cementing any of the available dissolved copper. The solutions were recirculated for a period of 10 days on a dump containing about 10 million tons of material with less than 0.30 percent total copper.

Table III sets forth the analysis of the iron values regenerated in the field test.

TABLE III

Calculations based on chemical analysis of "ON" and "OFF" solutions from the testing dump

| Recirculation Time Days | Chemical Analysis gpl "OFF" Solution | | % Regenerated |
|---|---|---|---|
|  | Total Fe | Fe+++ |  |
| 1 | 22.9 | 10.6 | 46.29 |
| 2 | 22.1 | 13.4 | 60.63 |
| 3 | 21.2 | 13.6 | 64.16 |
| 4 | 21.0 | 14.1 | 67.14 |
| 5 | 21.3 | 15.4 | 72.30 |
| 6 | 21.3 | 16.0 | 75.12 |
| 7 | 21.8 | 17.2 | 78.90 |
| 8 | 21.6 | 16.8 | 77.78 |
| 9 | 22.3 | 17.6 | 78.92 |
| 10 | 21.3 | 17.2 | 80.75 |
| 11 | 19.6 | 17.0 | 86.73 |

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. A process for the leaching and recovery of copper values from copper-containing material which comprises:

vat leaching sulfidic copper ore with an aqueous acidic ferric sulfate leach solution containing at least 10 gpl ferric ion to form a copper-pregnant leach solution containing substantially less than 10 gpl ferric ion and a corresponding increase in ferrous ion concentration, extracting said leach solution with an extractant selective to copper and non-selective to iron to strip the copper values from said leach solution, adjusting the acid content of the stripped leach solution to about 10 to 20 gpl, passing said acidic stripped leach solution through at least one mineral dump containing oxidized copper for a time sufficient to cause reoxidation of ferrous ion to restore the concentration of ferric ion to at least about 10 gpl, adding sufficient sulfuric acid to the dump off-solution to cause said solution to have an acid concentration of from about 10 to about 20 gpl, and recycling said acidic ferric sulfate leach solution to the vat leaching operation.

2. The process according to claim 1 wherein the acidic stripped leach solution is passed through at least two dumps containing oxidized copper minerals and in which sulfuric acid is added to the off-solution from the first dump to bring its acid content to between about 10 to 20 gpl prior to passing said solution through the next dump.

3. The process according to claim 1 wherein the retention time of the solution in the dump is at least 10 days.

4. The process of claim 3 wherein the retention time of the solution in the dump is sufficient to regenerate the ferric ion concentration to at least about 15 gpl.

* * * * *

UNITED STATES PATENT AND TRADEMARK OFFICE
CERTIFICATE OF CORRECTION

PATENT NO. : 4,032,330
DATED : June 28, 1977
INVENTOR(S) : Gerald F. Fountain et al It is certified that error appears in the above-identified patent and that said Letters Patent are hereby corrected as shown below:

Column 1, line 56, "correspondingincrease" should read

--corresponding increase--

Column 2, line 5, "operating" should read --operation--

Column 4, line 24, "2 1/2" should read -- -2 1/2--

Column 4, line 31, "1/8" should read --3/8--

Column 5, line 23, "values regenerated..." should read

--Table II below sets forth the analysis of
the iron values regenerated...--

Signed and Sealed this

Eighth Day of November 1977

[SEAL]

Attest:

RUTH C. MASON
*Attesting Officer*

LUTRELLE F. PARKER
*Acting Commissioner of Patents and Trademarks*